US011700432B2

(12) United States Patent
Aksu et al.

(10) Patent No.: US 11,700,432 B2
(45) Date of Patent: Jul. 11, 2023

(54) METHOD AND APPARATUS FOR SIGNALING AND STORING GROUPING TYPES IN AN IMAGE CONTAINER FILE

(71) Applicant: Nokia Technologies Oy, Espoo (FI)

(72) Inventors: Emre Aksu, Tampere (FI); Miska Hannuksela, Tampere (FI)

(73) Assignee: Nokia Technologies Oy, Espoo (FI)

( * ) Notice: Subject to any disclaimer, the term of this patent is extended or adjusted under 35 U.S.C. 154(b) by 171 days.

(21) Appl. No.: 17/045,722

(22) PCT Filed: Apr. 5, 2019

(86) PCT No.: PCT/FI2019/050273
§ 371 (c)(1),
(2) Date: Oct. 6, 2020

(87) PCT Pub. No.: WO2019/197718
PCT Pub. Date: Oct. 17, 2019

(65) Prior Publication Data
US 2021/0160587 A1 May 27, 2021

Related U.S. Application Data

(60) Provisional application No. 62/655,991, filed on Apr. 11, 2018.

(51) Int. Cl.
H04N 21/81 (2011.01)
G06F 16/51 (2019.01)
(Continued)

(52) U.S. Cl.
CPC ......... H04N 21/8153 (2013.01); G06F 16/51 (2019.01); H04N 21/4312 (2013.01); H04N 21/4342 (2013.01)

(58) Field of Classification Search
CPC ........... H04N 21/8153; H04N 21/4312; H04N 21/4342; H04N 21/23; H04N 21/85406; G06F 16/51
See application file for complete search history.

(56) References Cited

U.S. PATENT DOCUMENTS

2016/0371265 A1* 12/2016 Aksu ................. G06F 16/51
2017/0039686 A1* 2/2017 Miura ............... G06F 3/04845
2018/0160156 A1* 6/2018 Hannuksela ....... H04N 21/8456

FOREIGN PATENT DOCUMENTS

EP 3107011 A1 * 12/2016 ......... G06F 17/2705
EP 3107011 A1 12/2016

OTHER PUBLICATIONS

Extended European Search Report received for corresponding European Patent Application No. 19785049.8, dated Dec. 23, 2021, 6 pages.
Hannuksela, "Draft of white paper on High Efficiency Image File Format", Communications, ISO/IEC JTC1/SC29/WG11 MPEG2015/N15822, Oct. 2015, 10 pages.
"Information technology—High efficiency coding and media delivery in heterogeneous environments—Part 12 Image File Format", ISO/IEC 23008-12, First edition, Dec. 2017, 82 pages.
Gellens et al., "The 'Codecs' and 'Profiles' Parameters for "Bucket" Media Types", RFC 6381, Internet Engineering Task Force, Aug. 2011, pp. 1-19.
(Continued)

Primary Examiner — Asghar H Bilgrami
(74) Attorney, Agent, or Firm — Harrington & Smith

(57) ABSTRACT

A method, apparatus and computer program product are provided to store and signal pre-derivation properties in an image container file (24, 26). Relative to the construction of image package comprising an image container file, the method, apparatus and computer program product assign a pre-derivation property identifier data structure identifying one or more pre-derivation properties of one or more pre-derived images (22). With respect to the processing of an image container file, the method, apparatus and computer program product permit an image container file and a pre-derivation property identifier data structure identifying one or more pre-derivation properties of one or more pre-derived images in the image be processed to cause one or more pre-derived image items from the image container file (Continued)

to be rendered or edited and regenerated in accordance with the pre-derivation properties.

20 Claims, 6 Drawing Sheets

(51) Int. Cl.
*H04N 21/431* (2011.01)
*H04N 21/434* (2011.01)
*H04N 21/854* (2011.01)
*H04N 21/23* (2011.01)

(56) References Cited

OTHER PUBLICATIONS

"Information Technology—Coding Of Audio-Visual Objects—Part 12: ISO base media file format", ISO/IEC 14496-12, Fifth edition, Feb. 20, 2015, 254 pages.
International Search Report and Written Opinion received for corresponding Patent Cooperation Treaty Application No. PCT/FI2019/050273, dated Jun. 28, 2019, 14 pages.
Heikkilä, "High Efficiency Image File Format implementation", Master of Science thesis, 2016, 61 pages.

* cited by examiner

METHOD AND APPARATUS FOR SIGNALING AND STORING GROUPING TYPES IN AN IMAGE CONTAINER FILE

RELATED APPLICATION

This application claims priority to PCT Application No. PCT/FI2019/050273, filed on Apr. 5, 2019, which claims priority to U.S. Provisional Application No. 62/655,991, filed on Apr. 11, 2018, each of which is incorporated herein by reference in its entirety.

TECHNOLOGICAL FIELD

An example embodiment relates generally to signaling pre-derivation properties in an image container file and, more particularly, to signaling pre-derivation properties associated with pre-derived images within an image container file.

BACKGROUND

Image files are frequently created, stored, transmitted and/or rendered. In order to facilitate the use of image files, standards have been developed in order to regulate the construction of image files, thereby facilitating the uniform construction and subsequent processing of such image files.

In this regard, the International Standards Organization (ISO) Base Media File Format (ISOBMFF) defines a general structure for image files. Building on top of ISOBMFF, a High Efficiency Image File Format (HEIF) standard has been developed by the Moving Picture Experts Group (MPEG) for the storage of images and image sequences. HEIF includes a rich set of features. One such feature of the HEIF file format is the capability to store multiple image items in the same file. These image items can have logical relationships to each other. The image items may include one or more pre-derived images which have been derived from a base item.

BRIEF SUMMARY

A method, apparatus and computer program product are provided in accordance with an example embodiment in order to signal and store pre-derivation properties associated with pre-derived images within an image container file. Although the method, apparatus and computer program product may be utilized in conjunction with a variety of differently formatted images, the method, apparatus and computer program product of an example embodiment is described in conjunction with the HEIF.

In one example embodiment, a method is provided that includes receiving one or more base image items and one or more pre-derived image items associated with the one or more base image items. The method also includes assigning a pre-derivation property identifier data structure identifying one or more pre-derivation properties of the one or more pre-derived image items. The method further includes constructing an image package comprising the one or more base image items, the one or more pre-derived image items, and the pre-derivation property identifier.

In some implementations of such a method, the image package is an image container file; and the pre-derivation property identifier is one or more descriptive properties in the image container file. In some embodiments, the image package is an image container file, and the pre-derivation property identifier comprises one or more group boxes each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, an apparatus is provided that includes at least one processor and at least one memory including computer program code for one or more programs with the at least one memory and the computer program code configured to, with the at least one processor, cause the apparatus at least to: receive one or more base image items and one or more pre-derived image items associated with the one or more base image items; assign a pre-derivation property identifier data structure identifying one or more pre-derivation properties of the one or more pre-derived image items; and construct an image package comprising the one or more base image items, the one or more pre-derived image items, and the pre-derivation property identifier.

In some implementations of such an apparatus, the image package is an image container file, and the pre-derivation property identifier is one or more descriptive properties in the image container file. In some embodiments, the image package is an image container file, and the pre-derivation property identifier comprises one or more group boxes, each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, an apparatus is provided that includes means for receiving one or more base image items and one or more pre-derived image items associated with the one or more base image items. The apparatus also includes means for assigning a pre-derivation property identifier data structure identifying one or more pre-derivation properties of the one or more pre-derived image items. The apparatus further includes means for constructing an image package comprising the one or more base image items, the one or more pre-derived image items, and the pre-derivation property identifier.

In some implementations of such an apparatus, the image package is an image container file, and the pre-derivation property identifier is one or more descriptive properties in the image container file. In some embodiments, the image package is an image container file, and the pre-derivation property identifier comprises one or more group boxes, each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, a computer program product is provided that includes at least one non-transitory computer-readable storage medium having computer executable program code instructions stored therein with the computer executable program code instructions comprising program code instructions configured, upon execution, to: receive one or more base image items and one or more pre-derived image items associated with the one or more base image items; assign a pre-derivation property identifier data structure identifying one or more pre-derivation properties of the one or more pre-derived image items; and construct an image package comprising the one or more base image items, the one or more pre-derived image items, and the pre-derivation property identifier.

In some implementations of such a computer program product, the image package is an image container file, and the pre-derivation property identifier is one or more descriptive properties in the image container file. In some embodiments, the image package is an image container file, and the pre-derivation property identifier comprises one or more group boxes each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, a method is provided that includes: receiving an image package comprising one or more base image items and one or more pre-derived image items; identifying one or more pre-derivation properties associated with each of the one or more pre-derived image items; and causing the one or more pre-derived image items to be rendered in accordance with the one or more pre-derivation properties that has been identified.

In some implementations of such a method, the image package is an image container file; and the pre-derivation property identifier is one or more descriptive properties in the image container file. In some embodiments, the image package is an image container file, and the pre-derivation property identifier comprises one or more group boxes, each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, an apparatus is provided that includes at least one processor and at least one memory including computer program code for one or more programs with the at least one memory and the computer program code configured to, with the at least one processor, cause the apparatus at least to: receive an image package comprising one or more base image items and one or more pre-derived image items; identify one or more pre-derivation properties associated with each of the one or more pre-derived image items; and cause the one or more pre-derived image items to be rendered in accordance with the one or more pre-derivation properties that has been identified.

In some implementations of such an apparatus, the image package is an image container file, and the pre-derivation property identifier is one or more descriptive properties in the image container file. In some embodiments, the image package is an image container file, and the pre-derivation property identifier comprises one or more group boxes, each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, an apparatus is provided that includes means for receiving an image package comprising one or more base image items and one or more pre-derived image items; means for identifying one or more pre-derivation properties associated with each of the one or more pre-derived image items; and means for causing the one or more pre-derived image items to be rendered in accordance with the one or more pre-derivation properties that has been identified.

In some implementations of such an apparatus, the image package is an image container file, and the pre-derivation property identifier is one or more descriptive properties in the image container file. In some embodiments, the image package is an image container file, and the pre-derivation property identifier comprises one or more group boxes, each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

In another example embodiment, a computer program product is provided that includes at least one non-transitory computer-readable storage medium having computer executable program code instructions stored therein with the computer executable program code instructions comprising program code instructions configured, upon execution, to: receive an image package comprising one or more base image items and one or more pre-derived image items; identify one or more pre-derivation properties associated with each of the one or more pre-derived image items; and cause the one or more pre-derived image items to be rendered in accordance with the one or more pre-derivation properties that has been identified.

In some implementations of such a computer program product, the image package is an image container file, and the pre-derivation property identifier is one or more descriptive properties in the image container file. In some embodiments, the image package is an image container file, and the pre-derivation property identifier comprises one or more group boxes, each having a grouping type associated with a pre-derivation property. In some embodiments, the image package comprises an image container file and a description file associated with the image container file, and the description file comprises the pre-derivation property identifier. In some embodiments, the one or more pre-derivation properties is one or more of: an exposure bracketing, a focus bracketing, a depth of field bracketing, a flash-bracketing, an international standards organization (ISO) bracketing, a white balance bracketing, or a high dynamic range bracketing.

BRIEF DESCRIPTION OF THE DRAWINGS

Figure 1:
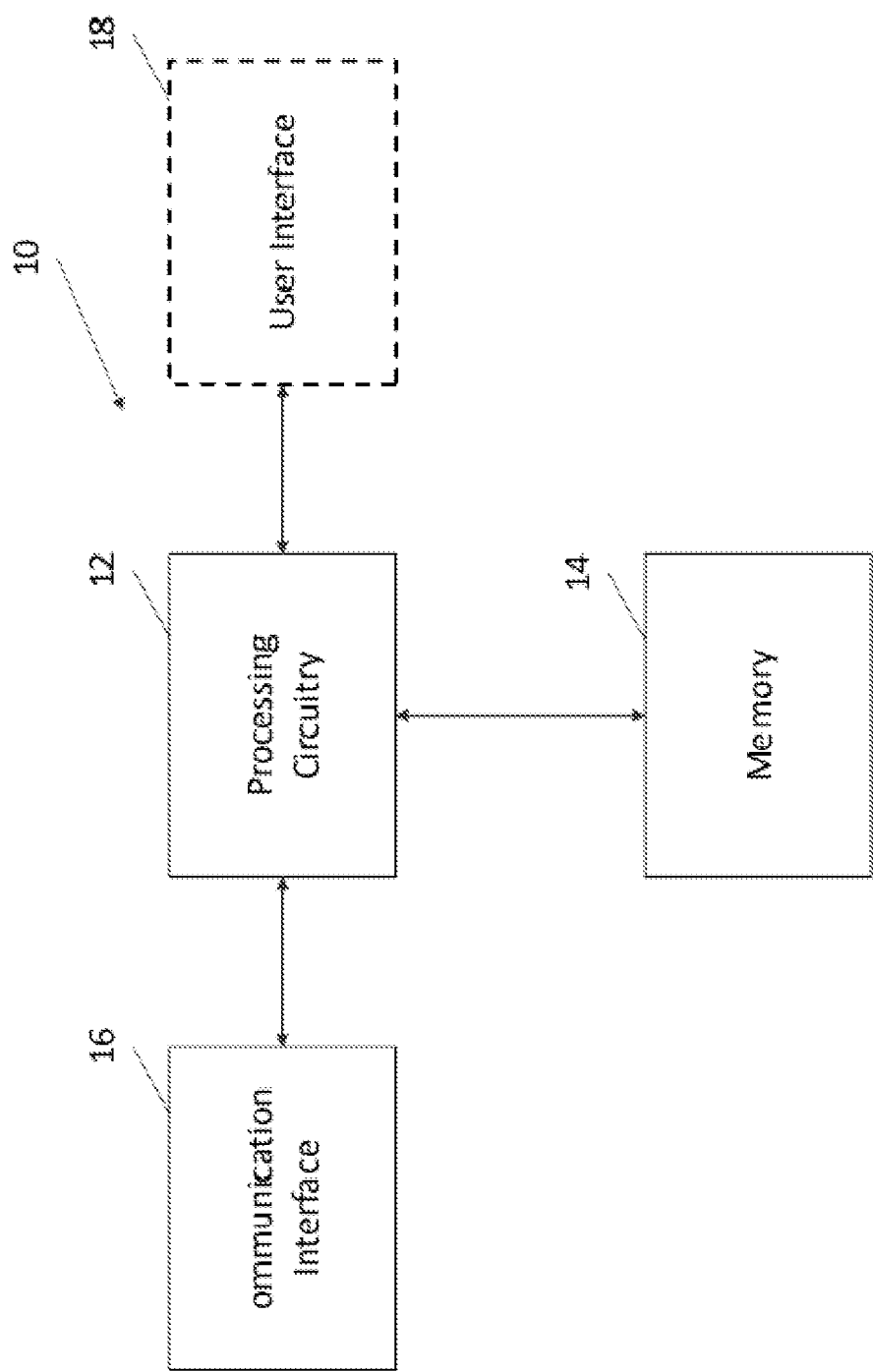
Figure 2:
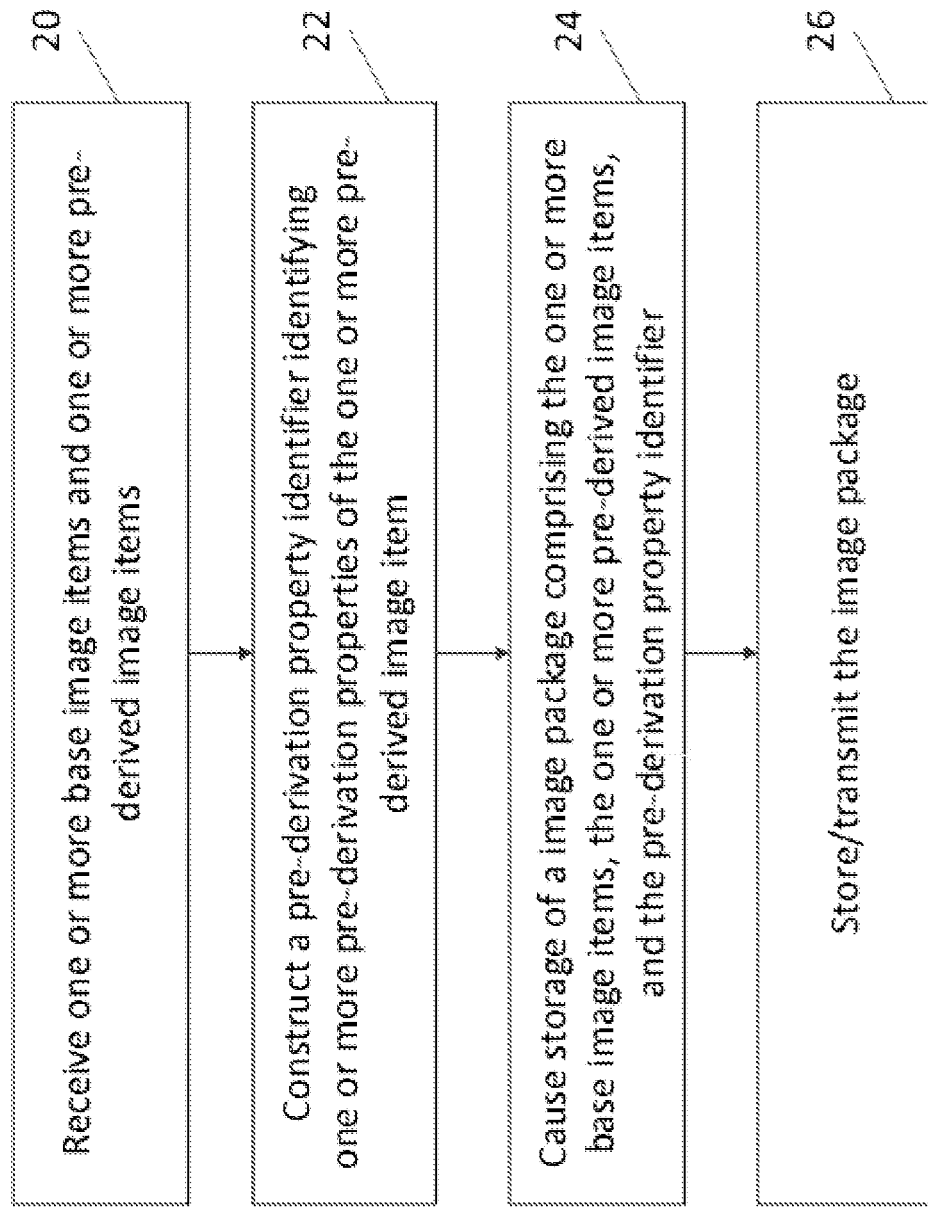
Figure 3:
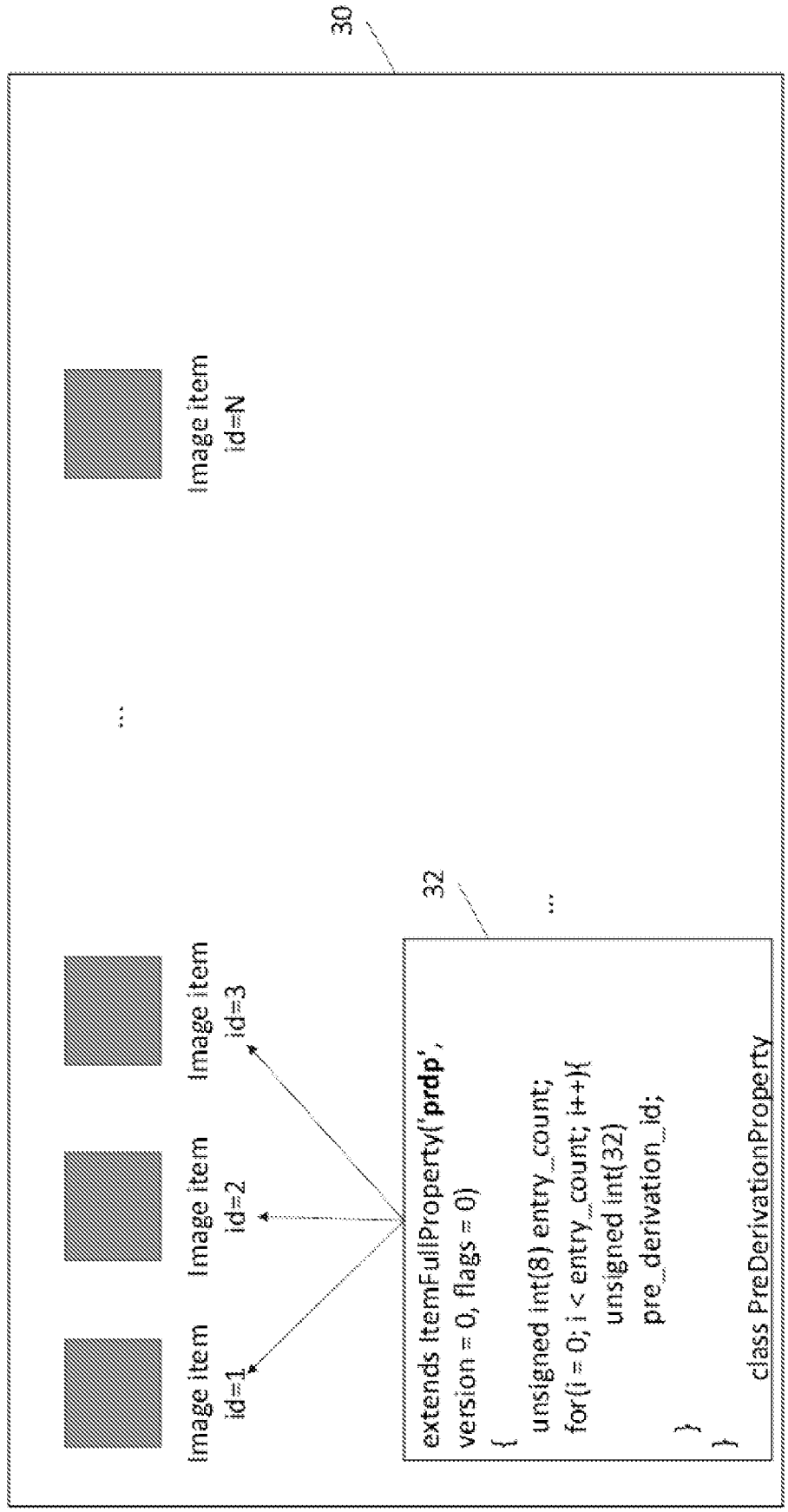
Figure 4:
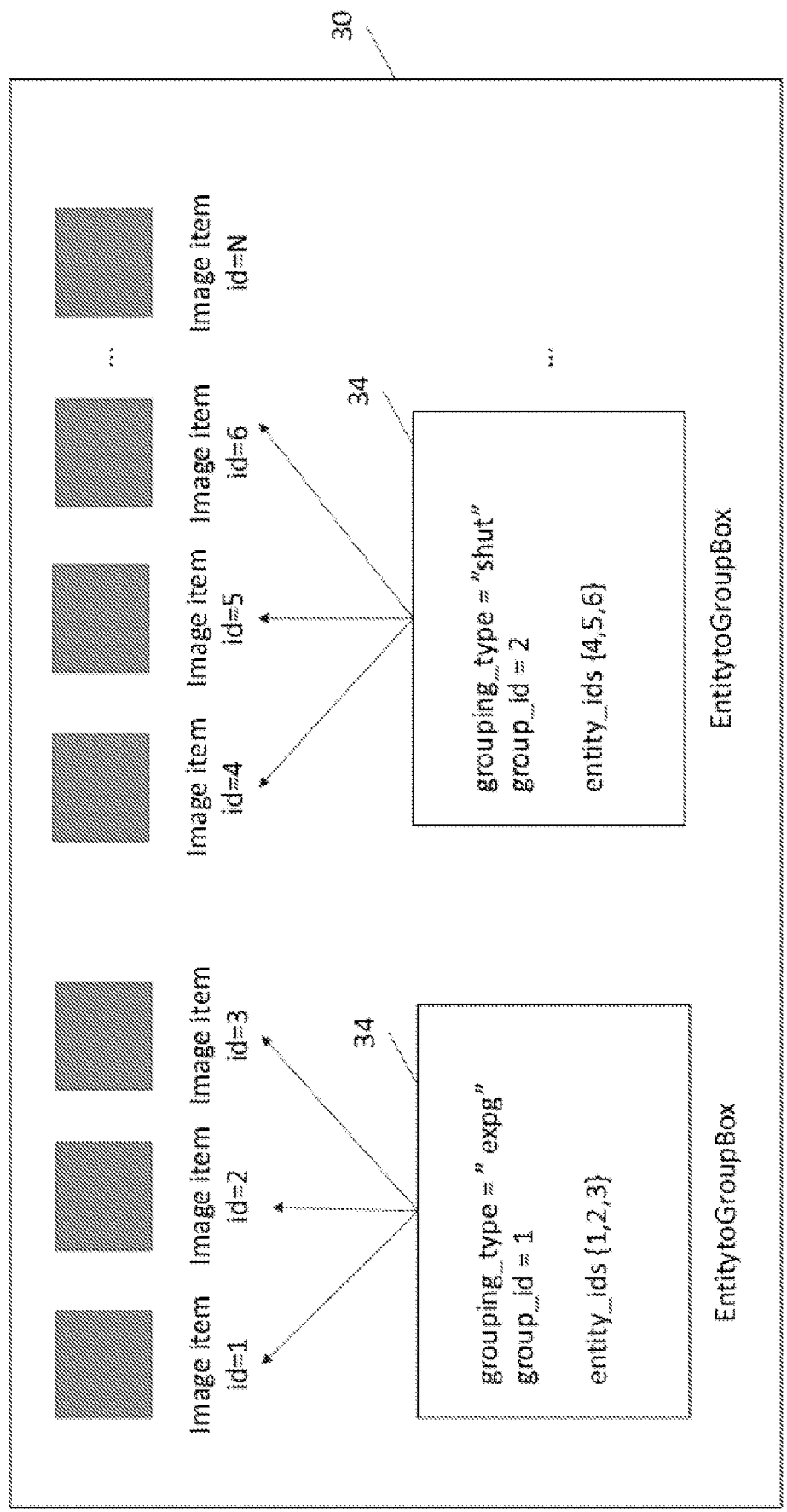
Figure 5:
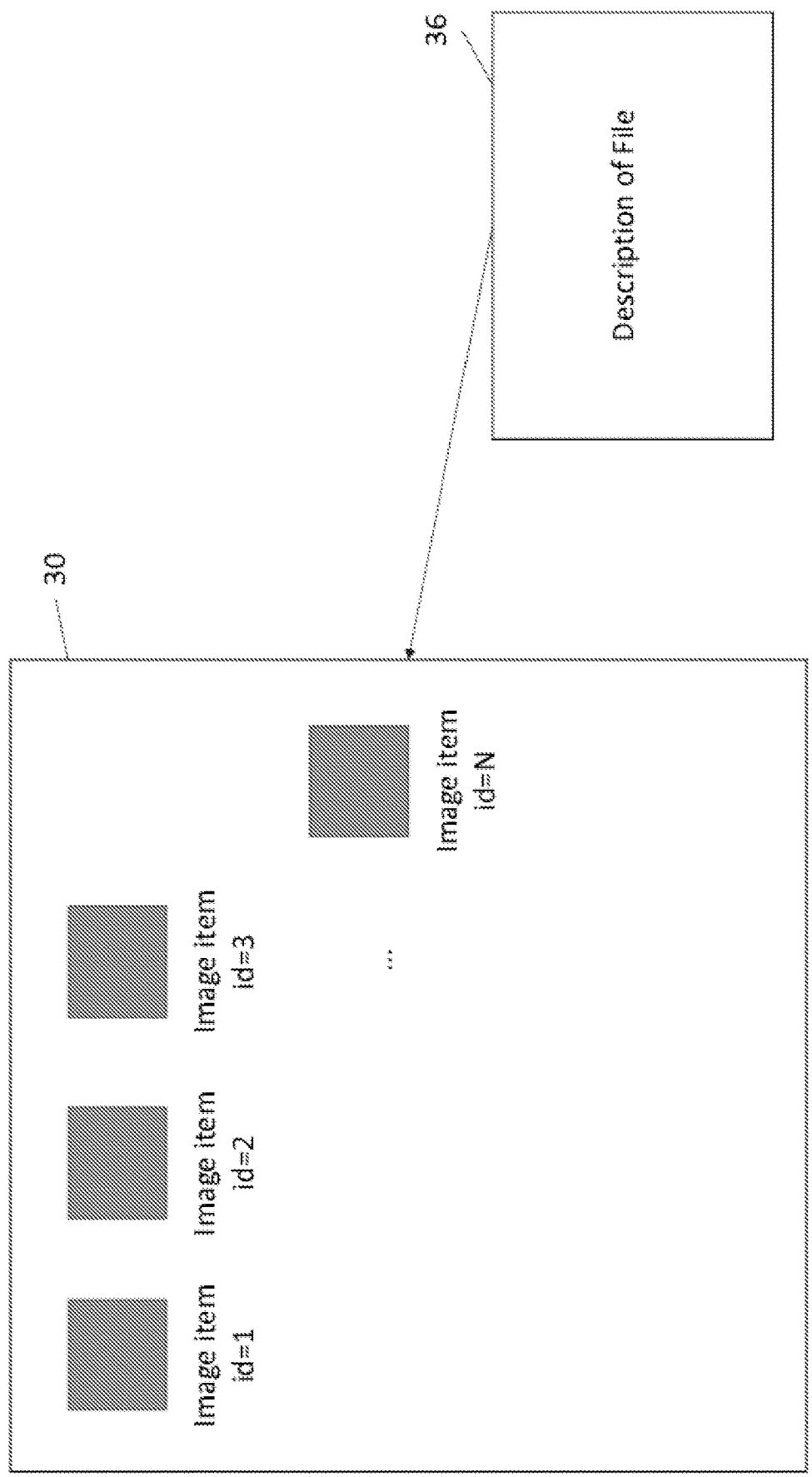
Figure 6:
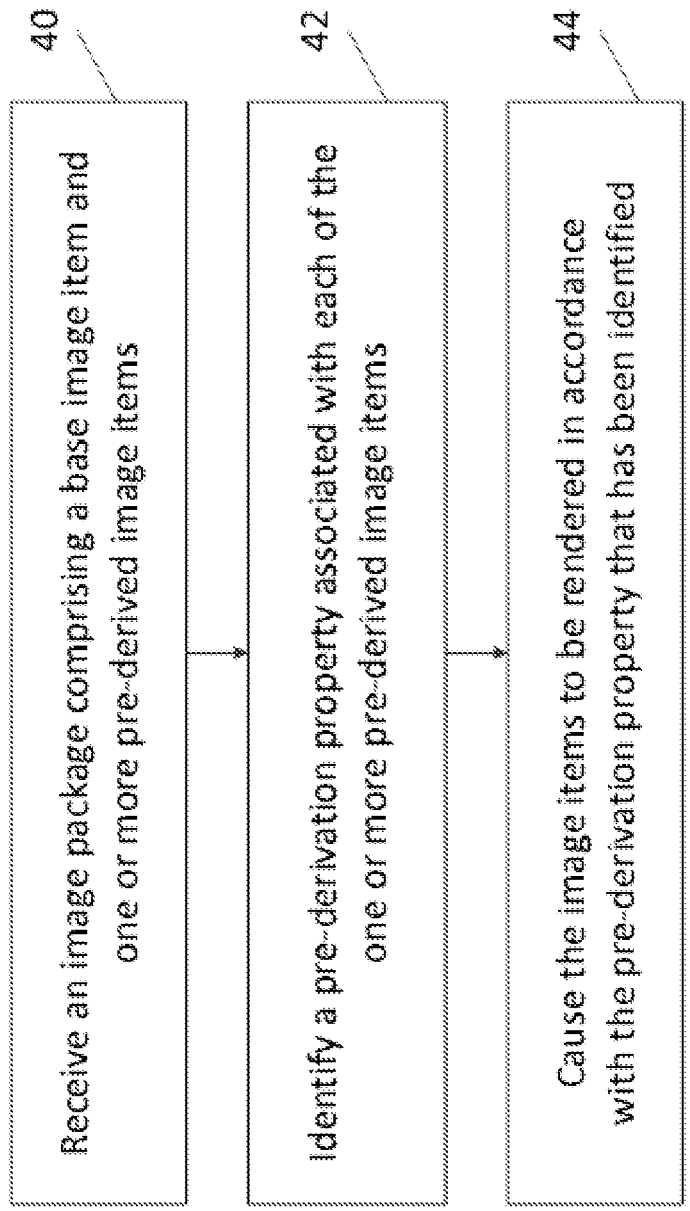

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIG. 2 is a flow chart illustrating operations performed, such as by the apparatus of FIG. 1, in order to construct an image package in accordance with an example embodiment of the present disclosure;

FIG. 3 illustrates an image container file having a pre-derivation property identifier in the form of one or more descriptive properties in the image container file in accordance with an example embodiment of the present disclosure;

FIG. 4 illustrates an image container file having a pre-derivation property identifier in the form of group boxes with grouping types identifying pre-derivation properties associated with pre-derived image items in accordance with an example embodiment of the present disclosure;

FIG. 5 illustrates an image container file having a pre-derivation property identifier associated with a description file of the image container file in accordance with an example embodiment of the present disclosure; and FIG. 6 is a flow chart illustrating the operations performed, such as by the apparatus of FIG. 1, in order to process an image package comprising an image container file and to cause one or more pre-derived image items included within the image container file to be rendered in accordance with pre-derivation properties associated with the pre-derived image items in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to one or more or all of the following: (a) hardware-only circuit implementations (such as implementations in analog circuitry and/or digital circuitry); (b) combinations of circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as a microprocessor(s) or a portion of a microprocessor(s), that requires software (e.g., firmware) for operation, but the software may not be present when needed for operation. This definition of 'circuitry' applies to all uses of this term in this application, including in any claims. As a further example, as used in this application, the term 'circuitry' also covers an implementation of merely a hardware circuit or processor (or multiple processors) or portions of a hardware circuit or processor and its (or their) accompanying software and/or firmware. The term 'circuitry' also covers, for example and if applicable to the particular claim element, a baseband integrated circuit or processor integrated circuit for a mobile phone or a similar integrated circuit in a server, a cellular network device or other computing or network device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment to utilize a pre-derivation property identifier associated with pre-derived image items. As such, an image package comprising an image container file including one or more base image items and one or more pre-derived image items may be constructed as to include a pre-derivation property identifier data structure identifying the pre-derivation property of the one or more pre-derived images. Correspondingly, image container files including one or more base image items and one or more pre-derived image items may be efficiently processed in order to permit the image items to be rendered in accordance with the pre-derivation property. Thus, the method, apparatus and computer program product facilitate use cases relating to pre-derived image items, such as use cases permitted by the features of the high-efficiency image file format (HEIF).

The method, apparatus and computer program product may be utilized in conjunction with a variety of different image files including image files formatted in accordance with a number of different formats including various container file formats. By way of example, but not of limitation, however, the method, apparatus and computer program product will be described below in conjunction with image files formatted in accordance with the ISOBMFF and, more particularly, in conjunction with the HEIF that is built on top of the ISOBMFF for the storage of images and image sequences. HEIF has a rich set of features and, as a result, is feature-wise superior to at least some other image file formats.

With respect to ISOBMFF, an image container file is provided that includes one or more building blocks called box(es). Each box may have a header and a payload. The box header indicates the type of the box and the size of the box, typically in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISOBMFF may be considered to specify a hierarchical structure of boxes. Each box of the ISO base media file may be identified by a four-character code (4CC, fourCC). A four-character code may interchangeably be represented by a 32-bit unsigned integer (by assuming a certain conversion of characters to 8-bit values, a certain bit endianness, and a certain byte endianness). The header may provide information about the type and size of the box.

One feature of the HEIF is its capability to store multiple images in the same file. These images, called image items, can have logical relationships to each other. Such relationships are signalled using the ItemReferenceBox, which is defined in the ISOMBFF with the following syntax:

```
aligned(8) class SingleItemTypeReferenceBox(referenceType) extends
Box(referenceType) {
   unsigned int(16) from_item_ID;
   unsigned int(16) reference_count;
   for (j=0; j<reference_count; j++) {
      unsigned int(16) to_item_ID;
   }
}
aligned(8) class SingleItemTypeReferenceBoxLarge (referenceType)
extends
Box(referenceType) {
   unsigned int(32) from_item_ID;
   unsigned int(16) reference_count;
   for (j=0; j <reference count; j++) {
      unsigned int(16) to_item_ID;
   }
}
aligned(8) class ItemReferenceBox extends
FullBox('iref', version, 0) {
   if (version==0) {
      SingleItemTypeReferenceBox references[];
   } else if (version==1) {
      SingleItemTypeReferenceBoxLarge references[];
   }
}
``` where
referenceType contains an indication of the type of the reference
from_item_id contains the ID of the item that refers to other items
reference_count is the number of references
to-item-id contains the ID of the item referred to HEIF file defines an image type called a pre-derived coded image (pre-derived image). As used herein, the terms "pre-derived image" and "pre-derived coded image" are used interchangeably.

If a coded image has been derived from other images, for example, a composite High Definition Range (HDR) image derived from exposure-bracketed individual images, then the coded image may be linked by item references of type 'base' to all other images which the coded image is derived from. An image item including a 'base' item reference is referred to as a pre-derived coded image (pre-derived image). Hence a 'base' item reference indicates that the referred images are utilized to generate the pre-derived image. The 'base' item reference is provided as an example and other similar type of item references can be used in a different embodiment.

HEIF file format currently has no defined way to indicate what kind of a pre-derivation operation is applied to an image, e.g., a base image, in order to obtain the pre-derived image. Pre-derived images may be used for various purposes. One use case of pre-derivation is to be able to re-process the images referenced with type 'base' and be able to regenerate the pre-derived coded image by re-processing. Currently, the process owner, by parsing the HEIF file; has no way to understand what kind of a pre-derivation operation is applied to an image, e.g., a base image. Since HEIF file format lacks a mechanism to identify what kind of pre-derivation is used to generate the pre-derived images, inefficiencies will occur in future rendering or editing and regeneration of these pre-derived images. Therefore, there is a need for signaling such pre-derivation property.

As used herein, the term "image package" refers to either an image container file, or the combination of an image container file and a description file including a pre-derivation property identifier data structure associated with the image container file. In some embodiments, the image container file is a HEIF file. In some embodiments, the description file is one or more of the following:

a specific HTML (Hypertext Markup Language) tag for an image file referenced from an HTML page, an optional MIME (Multipurpose Internet Mail Extensions) media parameter for an image file, e.g. referred to as prederivtype, a file format brand that may be indicated with the profiles MIME parameter (defined in IETF RFC 6381).

including a file index with a full or partial copy of the file-level MetaBox within the fileindex MIME parameter specified in the partial file format (ISO/IEC 23001-14, MPEG N17388). The fileindex MIME parameter contains a base-64 encoded BoxFileIndexBox (also specified in ISO/IEC 23001-14), which in this embodiment contains a FrontPartBox (also specified in ISO/IEC 23001-14) replicating the content of the MetaBox fully or partially.

a file index, such as BoxFileIndexBox, carried by other means than the MIME parameter (as explained above), such as through a separate URI reference In some embodiments, the description file may be downloaded by a browser or an application prior to downloading or parsing the image container file itself.

As used herein, the term "pre-derivation property identifier data structure" refers to one or more identifiers contained within or associated with an image container file that identifies one or more pre-derivation properties of one or more pre-derived image items in an image container file. In some embodiments, the pre-derivation property identifier data structure is provided as one or more descriptive item properties each identifying a pre-derivation property included in an image container file. In another embodiment, the pre-derivation property identifier data structure is included as part of a description file associated with an image container file. In yet another embodiment, the pre-derivation property identifier data structure is provided in the form of one or more group boxes, each having a grouping type associated with a pre-derivation property. As used herein, the term "regenerate" refers to processing of image items in an image container file to reconstruct a pre-derived image for a certain purpose, such as rendering of a pre-derived image item.

Regardless of the file format of the image file, the apparatus of an example embodiment may be provided by any of a wide variety of computing devices including, for example, an image processor, a video encoder, a video decoder, a mobile terminal, such as a smartphone, a tablet computer, a personal computer, a computer workstation or any other device configured to process an image file. Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical image set (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied in the form of one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical image set. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including an image container file, one or more image items, one or more audio tracks or the like. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to process the image container file and render the one or more image items included within the image container file, the apparatus 10 may optionally include a user interface 18 that may, in turn, be in communication with the processing circuitry 12 to provide output to the user, such as by rendering or editing and regeneration the image item(s) in the image container file and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

Referring now to FIG. 2, the operations performed, such as by the apparatus 10 of FIG. 1, in order to construct an image package comprising an image container file in accordance with an example embodiment are depicted. As shown in block 20, the apparatus includes means, such as the processing circuitry 12, the communication interface 16 or the like, for receiving one or more base image items and one or more pre-derived image items. The one or more base image items may have been received from an image capture device, such as a camera, a video recorder, an image sensor or the like. Alternatively, the one or more base image items may have been captured and then stored and processed such that the one or more base image items and the one or more pre-derived image items are received from a database or other memory device with which the apparatus is in communication. The one or more base image items may be designated as a reference image item and the one or more base image items may be previously used to generate the one or more pre-derived images. Still further, the image items may be received via the communication interface following transmission from another device or entity.

Each image item is designated by a respective image identifier. Although various types of image identifiers may be utilized, the image identifiers of an example embodiment described herein are numerical and are sequentially assigned to the image items. Within a respective image container file, the different image items have different image identifiers such that an image identifier uniquely identifies a respective image item within the image container file. However, the image items within different image container files may have the same image identifiers with the image items having the same image identifier being differentiated based upon the image container file that includes the different image items.

Upon receipt of the image items, the apparatus 10 includes means, such as the processing circuitry 12, for assigning a pre-derivation property identifier data structure identifying one or more pre-derivation properties of the one or more pre-derived image items as shown in block 22 of FIG. 2. In an example embodiment, the pre-derivation property identifier data structure that is constructed is stored, at least temporarily, by the memory 14. As described below, FIGS. 3-5 illustrate different examples of an image container file 30, each of which includes a plurality of image items designated image item ID=1, image item ID=2 and so on, and different types of pre-derivation property identifier data structures associated with the image container file 30. In an example embodiment, the pre-derivation property identifier data structure is provided as a descriptive item property identifying a pre-derivation property included in an image container file with the following syntax as illustrated in block 32 of FIG. 3:

```
aligned(8) class PreDerivationProperty
extends ItemFullProperty('prdp', version = 0, flags = 0) {
  unsigned int(8) entry_count;
  for(i = 0; i < entry_count; i++) {
    unsigned int(32) pre_derivation_id;
  }
}
```

The 4-character code "prdp" is used to identify this property box. It should be noted that this 4-character code is for purposes of example. A different 4-character code could be utilized with a box structure having similar semantics.

pre_derivation_id is the index number of the enumerated list of possible pre-derivations applied in order to generate the pre-derived image item. Index starts at 0 and value 0 can be used to signal an "undefined" or "reserved" pre-derivation. There could be multiple pre_derivation_ids in the PreDerivationProperty class and the number of pre_derivation_ids may be indicated by entry_count. The pre-derivation image property indicates that all the 'base' referenced image items of the associated pre-derived coded image were utilized in all the derivation operations listed in the pre-derivation property to generate the pre-derived coded image.

A possible list of values for such an enumerated list is as follows: pre_derivation_id={undefined=, HDR=1, exposure_bracket=2, focus_bracket=3, white_balance_bracket=4, depth_bracket=5, 360_stitched_image=6, flash_bracket=7 . . . }.

The syntax presented above is merely an example embodiment and other similar embodiments can be utilized. For example, in an image container file such as HEIF or MIAF, the 'prdp' descriptive item property is defined with the following syntax:

```
aligned(8) class PreDerivationProperty
extends ItemFullProperty('prdp', version = 0, flags = 0) {
  unsigned int(8) entry_count;
  for(i = 0; i < entry_count; i++) {
    unsigned int(32) pre_derivation_4cc;
  }
}
``` pre_derivation_4cc is a four-character code indicating the type of derivation applied to generate the pre-derived image item The four-character codes may be limited to a registered set of codes. pre_derivation_4cc equal to 0 can be used to signal an "undefined" or "reserved" pre-derivation. There could be multiple pre_derivation_4ccs in the PreDerivationProperty class and the number of pre_derivation_4ccs may be indicated by entry_count. The pre-derivation image property indicates that all the 'base' referenced image items of the associated pre-derived coded image were utilized in all the derivation operations listed in the pre-derivation property to generate the pre-derived coded image.

In another embodiment, in an image container file such as HEIF or MIAF, the 'prdp' descriptive item property is defined with the following syntax:

```
aligned(8) class PreDerivationProperty
extends ItemFullProperty('prdp', version = 0, flags = 0) {
  unsigned int(8) entry_count;
  for(i = 0; i <entry_count; i++) {
    unsigned int(32) pre_derivation_uri;
  }
}
``` pre_derivation_url is a NULL-terminated UTF-8 (Uniform Transformation Format-8) string of a Uniform Resource Identifier (URI) indicating the type of applied derivation. pre_derivation_uri. A length of 0 can be used to signal an "undefined" or "reserved" derivation. There could be multiple pre_derivation_uris in the PreDerivationProperty class and the number of pre_derivation_uris may be indicated by entry_count. The pre-derivation image property indicates that all the 'base' referenced image items of the associated pre-derived coded image were utilized in all the derivation operations listed in the pre-derivation property to generate the pre-derived coded image.

In an example embodiment, each pre-derived image item is linked to at least one pre-derivation property in order to indicate its pre-derivation operation. In another embodiment, when a pre-derived image item is not linked to any pre-derivation property, the image item has an "undefined" pre-derivation. Linking a pre-derived image item to at least one pre-derivation property indicates that the image item is associated with a defined pre-derivation property. Each image item that is utilized during the pre-derivation is then referenced to the pre-derived image item by using an item reference of type "base".

In another example embodiment, each image item that contributes to the pre-derivation operation could have its own image descriptive item property box which defines its pre-derivation specific properties. Additionally, an entity-to-group mapping may be defined in order to signal the group of images which are utilized during the pre-derivation. This mapping could be achieved by first defining new entity-to-group grouping types to be used in the EntityToGroupBox as illustrated in block 34 of FIG. 4, which, in one embodiment, is defined as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` with group_id being a non-negative integer assigned to the particular grouping that is not equal to any group_id value of any other EntitytoGroupBox; num_entities_in_group specifies the number of entity_id values mapped to this entity group; and entity_id is resolved to an item, when an item with item_ID equal to entity_id.

Each image item which is used for pre-derivation is listed in the entity_id array. Some of the grouping types may include an exposure bracketing, a focus bracketing, a depth of field bracketing, a flash-bracketing, an international standards organization (ISO) bracketing, a white balance bracketing, and a high dynamic range bracketing. Those entity-to-group mapping may be utilized, such as by a decoder, to interpret the applied pre-derivation operation and involved images. A base item reference, such as the existing base item reference in HEIF format, is used for mapping image items to pre-derived images, so that backwards compatibility for pre-derived image items is established. Then the following grouping types and descriptive item properties can be defined to identify the pre-derivation properties. It should be noted that these grouping types and descriptive item properties are provided as examples and the definitions may be altered according to the embodiment.

1. Exposure Bracketing:
   define a grouping_type in EntityToGroupBox: "expg"
   define a descriptive item property: exposure property may be defined and stored to explain the exposure value of an image item

```
aligned(8) class ExposureProperty
    extends ItemFullProperty('expo', version = 0, flags = 0) {
        signed int(8) exposure_stop; // a negative or positive exposure stop value with reference to the default exposure stop value (0)
}
```

1.1 Shutter Speed:
   This property can be used in conjunction with exposure bracketing
   A descriptive item property named shutter speed property may be defined and stored to explain the shutter speed value of an image item

```
aligned(8) class ShutterProperty
    extends ItemFullProperty('shut', version = 0, flags = 0) {
        unsigned int(16) shutter_speed_inv; // inverse of shutter speed value in 1/secs. Final shutter speed is 1/shutter_speed_inv
}
```

1.2 ISO Property:
   This property may be defined and stored to explain the ISO value of an image item

```
aligned(8) class ISOProperty
    extends ItemFullProperty('isop', version = 0, flags = 0) {
        unsigned int(16) ISO_value; // ISO value used.
}
```

1.3
   In another embodiment, the above mentioned two properties could be merged into a single property definition as follows:

```
aligned(8) class ExposureBracketProperty
    extends ItemFullProperty('exbp', version = 0, flags = 0) {
        bit(1) exposure_stop_present // flag to signal the presence of exposure stop parameter
        bit(1) shutter_speed_present // flag to signal the presence of shutter speed parameter
        bit(1) iso_present // flag to signal the presence of ISO parameter
        bit(5) reserved
```

```
        if (exposure_stop_present)
            signed int(8) exposure_stop; //as defined in 1
        if (shutter_speed_present)
            unsigned int(16) shutter_speed_inv; //as defined in 1.1
        if (iso_present)
            unsigned int(16) ISO_value; //as defined in 1.2
    }
```

2. Focus Bracketing:
define a grouping_type in EntityToGroupBox: "focg"
a descriptive item property called f-stop property may be defined and stored to explain the focus value and aperture (1/f-stop) (F-stop is the focal length divided by the diameter of the lens) of an image item

```
    aligned(8) class FStopProperty
        extends ItemFullProperty('fstp', version = 0, flags = 0) {
            unsigned int(16) fstp_whole; // whole number part of the f-stop value.
            unsigned int(16) fstp_fractional; // fractional part of the f-stop value.
        }
    NOTE: if both fstp_whole and fstp_fractional are 0, then it can be assumed that
focus
is at infinity.
```

3. White Balance Bracketing:
define a new grouping_type in EntityToGroupBox: "whtb"
a descriptive item property called whitebalance property may be defined and stored to explain the white balance value of an image item

```
    aligned(8) class WhiteBalanceProperty
        extends ItemFullProperty('wtbp', version = 0, flags = 0) {
            signed int(8) white_balance_stop; // a negative or positive white balance stop
            value with reference to the default white balance value (0) positive values
            indicate "warmer" image, negative values indicate "cooler" image
        }
```

4. HDR Bracketing:
define a descriptive item property called HDR property:

```
    aligned(8) class HDRProperty
        extends ItemFullProperty('hdri', version = 0, flags = 0) {
            unsigned int(8) stops // number of stops used in the HDR bracketing
            unsigned int(8) contrast_ratio_mantissa // final contrast ratio mantissa value
            unsigned int(8) contrast_ratio_exponent //final contrast ratio exponent value
        }
```

"base" item reference may be used to reference image items contributing to the HDR bracketing In another embodiment, the above-defined fields could be included in a description of a file 36 that is associated with but not included in the image container file as illustrated in FIG. 5. The description of the file may be but is not limited to one or more of those explained earlier. For example, the BoxFileIndexBox may include the file-level MetaBox fully or partially, where the MetaBox contains the EntityTo-GroupBox as discussed above and can therefore be used to signal the image item properties and entity groupings before downloading or decoding the image file.

By assigning a pre-derivation property identifier data structure identifying one or more pre-derivation properties of the one or more pre-derived image items, the pre-derivation property of each of the one or more pre-derived image items can be uniquely identified, thereby permitting efficient processing and subsequent rendering or editing and regeneration of the image items in accordance with the respective pre-derivation.

As shown in block 24 of FIG. 2, the apparatus 10 also includes means, such as the processing circuitry 12 or the like, for construct an image package comprising the one or more base image items, the one or more pre-derived image items, and the pre-derivation property identifier. The image package may take the form of an image container file, or the combination of an image container file and a description file including a pre-derivation property identifier data structure associated with the image container file.

As shown in block 26, the apparatus 10 of an example embodiment also includes means, such as the processing circuitry 12, the memory 14 or the like, for storing the image package and/or means, such as the processing circuitry, the communication interface 16 or the like, for causing the package, to be transmitted, such as to another device that may store and/or render the image items in the image package. For example, the image package may be parsed in order to identify pre-derivation property associated with each pre-derived image.

Following construction, the image package may be, as indicated by block 26, stored, transmitted or other actions may be taken with respect to the image container file.

Thereafter, the image package file may be processed so as to render the image items, such as to present the images. As such, the operations associated with the processing of an image container file and the rendering or editing and regeneration of the one or more image items contained by the image container file are depicted in conjunction with FIG. 6. Although reference with respect to the apparatus configured to perform the operations of FIG. 6 is made below relative to the apparatus 10 of FIG. 1, the apparatus for performing the operations of FIG. 6 may be the same apparatus or a different apparatus, that is, embodied by a different computing device (e.g., a decoder) than that which constructs the image container file as described above in conjunction with FIG. 2 (e.g., an encoder). However, the apparatus configured to perform of the operations of FIG. 6 may include the user interface 18 as referenced below.

As shown in block 40 of FIG. 6, the apparatus 10 includes means, such as the processing circuitry 12, the communications interface 16 or the like, for receiving an image package. The image package may be received from a database or other memory device with which the apparatus is in communication or from another device that transmits the image package to the apparatus via the communications interface. As described above, an image package that is received includes one or more base image items, one or more pre-derived image items and the pre-derivation property identifier. The image package may be a single image container file or a combination of an image container file and a description file associated with the image container file.

As shown in block 42 of FIG. 6, the apparatus 10 includes means, such as the processing circuitry 12 or the like, for identifying pre-derivation property associated with each of the one or more pre-derived image items in the image package.

As shown in block 44 of FIG. 6, the apparatus 10 also includes means, such as the processing circuitry 12 or the like, for causing the image items to be rendered in accordance with the pre-derivation property that has been identified. As such, the method, apparatus and computer program product of an example embodiment permit efficient rendering by providing information regarding pre-derivation which would in-turn indicate what type of derivation could be used in rendering to more efficiently render the image items. During rendering of the pre-derived image items, the base image item(s) will be re-processed and utilized to regenerate the pre-derived image item(s). By signaling pre-derivation properties, an application processing the base image item (s) to regenerate the pre-derived images will be able to quickly identify the type of derivation needed in the processing and regenerating process, resulting in more efficient processing of the base image item(s) and rendering of the pre-derived image item(s).

As described above, FIGS. 2 and 6 are flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 2 and 6. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving one or more base image items and one or more pre-derived image items associated with the one or more base image items;
assigning a pre-derivation property identifier data structure identifying one or more pre-derivation properties of the one or more pre-derived image items, wherein the one or more pre-derived image items comprise one or more image items previously generated via application of respective identified ones of the one or more pre-derivation properties to respective ones of the one or more base image items; and
constructing an image package comprising the one or more base image items, the one or more pre-derived image items, and the pre-derivation property identifier data structure.

2. A method according to claim 1, wherein the image package comprises an image container file, and wherein the pre-derivation property identifier data structure comprises one or more descriptive properties in the image container file.

3. A method according to claim 1, wherein the image package comprises an image container file, and wherein the pre-derivation property identifier data structure comprises one or more group boxes, wherein respective ones of the one or more group boxes comprise a grouping type associated with a pre-derivation property of the one or more pre-derivation properties.

4. A method according to claim 1, wherein the image package comprises an image container file and a description file associated with the image container file, and wherein the description file comprises the pre-derivation property identifier data structure.

5. A method according to claim 1, wherein the one or more pre-derivation properties comprises an indication of one or more of:
an exposure bracketing,
a focus bracketing,
a depth of field bracketing,
a flash-bracketing,
an international standards organization bracketing,
a white balance bracketing, or
a high dynamic range bracketing.

6. An apparatus comprising
at least one processor and
at least one non-transitory memory including computer program code for one or more programs, the at least one memory and the computer program code configured to, with the at least one processor, cause the apparatus at least to:
receive one or more base image items and one or more pre-derived image items associated with the one or more base image items;
assign a pre-derivation property identifier data structure identifying one or more pre-derivation properties of the one or more pre-derived image items, wherein the one or more pre-derived image items comprise one or more image items previously generated via application of respective identified ones of the one or more pre-derivation properties to respective ones of the one or more base image items; and
construct an image package comprising the one or more base image items, the one or more pre-derived image items, and the pre-derivation property identifier data structure.

7. An apparatus according to claim 6, wherein the image package comprises an image container file, and wherein the pre-derivation property identifier data structure comprises one or more descriptive properties in the image container file.

8. An apparatus according to claim 6, wherein the image package comprises an image container file, and wherein the pre-derivation property identifier data structure comprises one or more group boxes, wherein respective ones of the one or more group boxes comprise a grouping type associated with a pre-derivation property of the one or more pre-derivation properties.

9. An apparatus according to claim 6, wherein the image package comprises an image container file and a description file associated with the image container file, and wherein the description file comprises the pre-derivation property identifier data structure.

10. An apparatus according to claim 6, wherein the one or more pre-derivation properties comprises an indication of one or more of:
an exposure bracketing,
a focus bracketing,
a depth of field bracketing,
a flash-bracketing,
an international standards organization bracketing,
a white balance bracketing, or
a high dynamic range bracketing.

11. A method comprising:
receiving an image package comprising one or more base image items and one or more pre-derived image items;
identifying one or more pre-derivation properties associated with respective ones of the one or more pre-derived image items, wherein the image package comprises a pre-derivation property identifier data structure comprising the one or more pre-derivation properties, wherein the one or more pre-derived image items comprise one or more image items previously generated via application of respective identified ones of the one or more pre-derivation properties to respective ones of the one or more base image items; and
causing the one or more pre-derived image items to be processed based, at least partially, on the one or more pre-derivation properties that has been identified.

12. A method according to claim 11, wherein the image package comprises an image container file, and wherein the pre-derivation property identifier data structure comprises one or more descriptive properties in the image container file.

13. A method according to claim 11, wherein the image package comprises an image container file, and wherein the pre-derivation property identifier data structure comprises one or more group boxes, wherein respective ones of the one or more group boxes comprise a grouping type associated with a pre-derivation property of the one or more pre-derivation properties.

14. A method according to claim 11, wherein the image package comprises an image container file and a description file associated with the image container file, and wherein the description file comprises the pre-derivation property identifier data structure.

15. A method according to any of claim 11, wherein the one or more pre-derivation properties comprises an indication of one or more of:

an exposure bracketing,
a focus bracketing,
a depth of field bracketing,
a flash-bracketing,
an international standards organization bracketing,
a white balance bracketing, or
a high dynamic range bracketing.

16. An apparatus comprising
at least one processor and
at least one non-transitory memory including computer program code for one or more programs, the at least one memory and the computer program code configured to, with the at least one processor, cause the apparatus at least to:
  receive an image package complising one or more base image items and one or more pre-derived image items;
  identify one or more pre-derivation properties associated with respective ones of the one or more pre-derived image items, wherein the image package comprises a pre-derivation property identifier data structure comprising the one or more pre-derivation properties, wherein the one or more pre-derived image items comprise one or more image items previously generated via application of respective identified ones of the one or more pre-derivation properties to respective ones of the one or more base image items; and
  process the one or more pre-derived image items based, at least partially, on the one or more pre-derivation properties that has been identified.

17. An apparatus according to claim 16, wherein the image package comprises an image container file, and wherein the pre-derivation property identifier data structure is one or more descriptive properties in the image container file.

18. An apparatus according to claim 16, wherein the image package comprises an image container file, and wherein the pre-derivation property identifier data structure comprises one or more group boxes, wherein respective ones of the one or more group boxes comprise a grouping type associated with a pre-derivation property of the one or more pre-derivation properties.

19. An apparatus according to claim 16, wherein the image package comprises an image container file and a description file associated with the image container file, and wherein the description file comprises the pre-derivation property identifier data structure.

20. An apparatus according to any of claim 16, wherein the one or more pre-derivation properties comprises an indication of one or more of:
  an exposure bracketing,
  a focus bracketing,
  a depth of field bracketing,
  a flash-bracketing,
  an international standards organization bracketing,
  a white balance bracketing, or
  a high dynamic range bracketing.

* * * * *